No. 696,403. Patented Apr. 1, 1902.
E. A. BLANTON, Jr.
CAM FASTENING FOR SHAFTS OF STAMP MILLS.
(Application filed July 17, 1893.)
(No Model.) 2 Sheets—Sheet 1.

Witnesses.
Geo. C. Howard
Edward E. Lawdumology

Inventor.
Edward A. Blanton Jr.

THE NORRIS PETERS CO., PHOTO-LITHO., WASHINGTON, D. C.

No. 696,403. Patented Apr. 1, 1902.
E. A. BLANTON, Jr.
CAM FASTENING FOR SHAFTS OF STAMP MILLS.
(Application filed July 17, 1893.)
(No Model.) 2 Sheets—Sheet 2.

---

UNITED STATES PATENT OFFICE.

EDWARD A. BLANTON, JR., OF WALLINGFORD, PENNSYLVANIA, ASSIGNOR TO BLANTON PATENTS SYNDICATE, LIMITED, OF LONDON, ENGLAND.

CAM-FASTENING FOR SHAFTS OF STAMP-MILLS.

SPECIFICATION forming part of Letters Patent No. 696,403, dated April 1, 1902.

Application filed July 17, 1893. Serial No. 480,745. (No model.)

*To all whom it may concern:*

Be it known that I, EDWARD A. BLANTON, Jr., a citizen of the United States, residing at Wallingford, in the county of Delaware and State of Pennsylvania, have invented certain new and useful Improvements in Cam-Fastenings for Shafts of Stamp-Mills, of which the following is a specification, and for which I have obtained Letters Patent of Great Britain, No. 11,071, dated June 6, 1893, and of the Transvaal, South African Republic, No. 542, dated July 25, 1893.

This invention relates to an improvement in the devices employed for securing the cams of stamp-mills upon the shafts of the same, the object being to provide a means by which the cams when worn out may be quickly replaced and securely held in position and to increase the life of the shaft; and my invention will be clearly understood by reference to the accompanying drawings, taken in connection with the following description.

Figure 1:
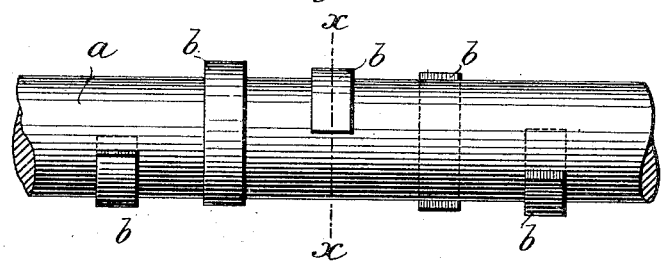
Figure 3:
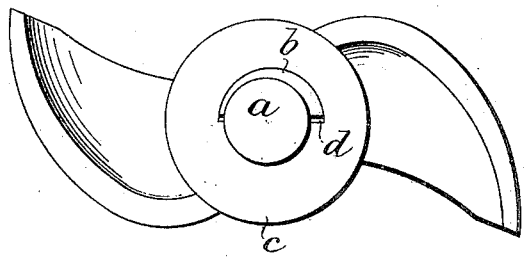
Figure 2:
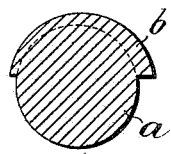
Figure 4:
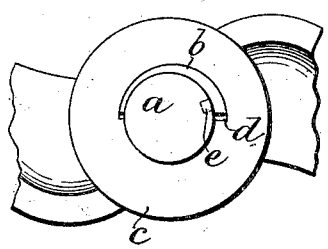
Figure 5:
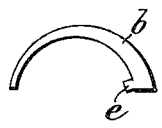
Figure 6:
Figure 7:
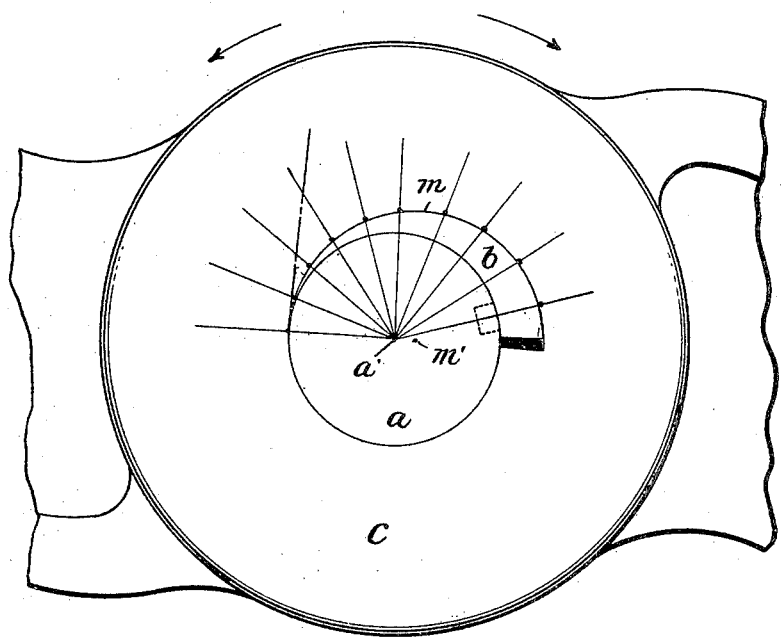

In the drawings, Figure 1 is a view of a crank-shaft constructed in accordance with my invention. Fig. 2 is a cross-section of the shaft on the line $xx$, Fig. 1. Fig. 3 is an end elevation of the shaft on a smaller scale, showing one of the cams applied thereto. Fig. 4 is a similar view with parts broken away to illustrate my invention. Fig. 5 is an end elevation of the wedge, shown detached from the shaft. Fig. 6 is a side view of the same, and Fig. 7 is a diagrammatic view showing one way of making the same.

In carrying out my invention I forge or otherwise form upon the shaft $a$ a number of bosses or wedges $b$ corresponding to the number of cams to be carried by the shaft, such bosses being arranged around the shaft in the requisite order to suit the positions to which it is desired the cams shall be set on the shaft. In the eye of each cam $c$ is also formed a corresponding recess $d$, the boss or wedge on the shaft and the recess in the eye of the cam being at the beginning or starting-point tangential, or nearly so, to the surface of the shaft and the circle of the eye of the cam, respectively, and extending thence rearwardly relatively to the direction of rotation a suitable distance circumferentially on gradually-increasing radii, so as to constitute a circumferential wedge or boss on the shaft and wedge-cavity in the eye of the cam.

In describing the wedges as extending circumferentially on gradually-increasing radii I use the term broadly; but in all cases the outer face or surface of the boss or wedge is upon a curve the radii of which measured from the center of the shaft gradually increase. Thus the outer face or surface of the wedge may be on a true eccentric, as in the form or species indicated in the diagram Fig. 7, in which the outer surface of the wedge is made to conform to a curve $m$, the center of which $m'$ is eccentric from the center $a'$ of the shaft $a$, so that, practically speaking, the radii of the curve $m$, taking the center of the shaft as a basic point, gradually increase. In all cases the outer surfaces of the bosses or wedges and the inner surfaces of the cam-recesses or wedge-cavities have, broadly speaking, gradually-increasing radii when measured from the center of the shaft, and the outer surfaces of the bosses or wedges correspond to the outlines of the inner surfaces of the cam-recesses, so as to make a close fit.

When the wedges are made separate from the shaft, as illustrated more particularly in Figs. 4 to 6, the inner curved surfaces of the wedges correspond to the outer curvature of the shaft, so that they fit closely thereon, and they are provided with lugs or projections $e$ on the thick ends thereof, which fit into corresponding openings formed in the shaft, so that when the wedges are applied they are prevented from shifting around the shaft not only by the friction between the surface of the shaft and the inner surfaces of the wedges, but by the additional resistance furnished by the lugs or projections $e$. In cam-fastenings especially for use in stamp-mills it is desirable and indeed necessary that the cams shall always be held in certain definite or well-defined relations to each other, for if one or more of the cams is out of its proper position the stamps will not follow each other in their regular order of drop, and if, for instance, by the shifting or slipping of the cams on the shaft two stamps drop near together they are liable to cause a splash in the battery, which may wash the gold or amalgam off the plate, and by my construction I find that when the bosses or wedges are once properly adjusted the cams will retain their proper relations to each other, and it is practically impossible for them to work slack, and no amount of use has any deleterious effects on the parts nor interferes in the slightest with the capacity of the device for keeping tight. Further, it will be seen that by my construction the contacting faces between the shaft and the bearing-socket of the cam do not exceed a semicircle, and this is an important feature in the application of the cams to the shaft. Each cam is adjusted by sliding it lengthwise to a position over the boss or wedge while inclined forward slightly relatively to the direction in which the cam is to be turned, and the fact that the bearing-face for the shaft in the socket of the cam does not exceed a half-circle permits the cam to be slid freely over the shaft, the shaft playing in the eccentric portion of the opening until the boss or wedge is reached, when it is slid over the boss or wedge, and by a sharp thrust in the direction opposite to the rotation of the cam it is made tight thereon and thereafter is kept tight by the reacting effect of the thrust of the cam on the tappets of the stamp-rods, while a blow of a hammer, for instance, on the end of one of the horns of the cam in the reverse direction slackens it when required. Further, it will be noticed that the bosses or wedges are of a width corresponding to the width of the hub of the cam and extend circumferentially around the shaft somewhat less than a semicircle, and thus they form a large bearing-surface both on the shaft and on the face of the recess in the hub. This not only furnishes a substantial and practical bearing, but also equalizes the bursting stress around the hub, as the stress is distributed throughout the circumferential range of the hub and the hub has a bearing either on the shaft or wedge, except for a short space at one or both ends of the wedge.

What I claim is—

1. The combination with a shaft, of a curved wedge secured against rotation thereon and having an outer face upon a curve the radii of which measured from the center of the shaft gradually increase, and a hub with an opening corresponding in part with and bearing on the face of the shaft and in part with and bearing on the entire outer face of the wedge, substantially as described.

2. The combination with a shaft, of a curved wedge secured against rotation thereon and having an outer face upon a curve the radii of which measured from the center of the shaft gradually increase, and a hub with an opening, a portion of which, not exceeding a semicircle, corresponds with and bears upon the face of the shaft, and a portion of the opening being curved and bearing on the entire outer face of the wedge, substantially as described.

3. The combination with a shaft, of a curved wedge secured against rotation thereon and having a face eccentric to said shaft, and a hub with an opening corresponding in part with and bearing on the face of the shaft and in part with and bearing on the entire outer eccentric face of the wedge, substantially as described.

4. The combination with a shaft, of a curved wedge secured against rotation thereon and having a face eccentric to said shaft, and a hub with an opening, a portion of which not exceeding a semicircle, corresponds with and bears on the face of the shaft and a portion of the opening being eccentrically curved and bearing on the entire outer face of the wedge, substantially as described.

5. The combination with a cam-shaft having a series of eccentric bosses or wedges thereon arranged in different relative positions, of cams having hubs with openings corresponding in part with and bearing on the face of the shaft and in part with and bearing on the entire outer faces of the eccentric bosses or wedges, the width of the cams approximating the width of the hubs, substantially as described.

In testimony whereof I have hereunto set my hand in the presence of two subscribing witnesses.

EDWARD A. BLANTON, JR.

Witnesses:
 GEO. C. HOWARD,
 EDWARD E. LAUDENSLAGER.